United States Patent
Romanet et al.

(10) Patent No.: US 7,153,641 B2
(45) Date of Patent: Dec. 26, 2006

(54) PHOTOGRAPHIC ELEMENT CONTAINING IMPROVED PYRAZOLOTRIAZOLE COUPLER

(75) Inventors: Robert F. Romanet, Rochester, NY (US); Michael W. Crawley, Watford (GB); Susan M. Fischer, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 149 days.

(21) Appl. No.: 11/037,410

(22) Filed: Jan. 18, 2005

(65) Prior Publication Data

US 2005/0142502 A1 Jun. 30, 2005

Related U.S. Application Data

(63) Continuation-in-part of application No. 10/661,119, filed on Sep. 12, 2003, now abandoned.

(51) Int. Cl.
  *G03C 1/08* (2006.01)
  *G03C 7/26* (2006.01)
  *G03C 7/32* (2006.01)
  *G03C 1/46* (2006.01)

(52) U.S. Cl. ............ 430/558; 430/502; 430/503; 430/505

(58) Field of Classification Search .......... 430/502, 430/503, 505, 558
See application file for complete search history.

(56) References Cited

U.S. PATENT DOCUMENTS

| 5,273,868 A | 12/1993 | Sakurazawa et al. |
| 5,565,310 A | 10/1996 | Kawai |
| 5,605,788 A | 2/1997 | Kawagishi et al. |
| 6,232,055 B1 | 5/2001 | Ohzeki et al. |
| 6,541,192 B1* | 4/2003 | Kato et al. ........... 430/558 |
| 6,558,885 B1* | 5/2003 | Sakai et al. .......... 430/505 |
| 6,852,478 B1* | 2/2005 | Sakai et al. .......... 430/503 |
| 6,858,380 B1* | 2/2005 | Kato et al. ........... 430/558 |

FOREIGN PATENT DOCUMENTS

| JP | 110559 | 4/1995 |
| JP | 08-146575 | 6/1996 |

* cited by examiner

*Primary Examiner*—Geraldine Letscher
(74) *Attorney, Agent, or Firm*—Arthur E. Kluegel

(57) ABSTRACT

A photographic element comprising a light-sensitive silver halide emulsion layer containing a 1H-pyrazolo[1,5-b][1,2,4]triazole coupler represented by structure (I):

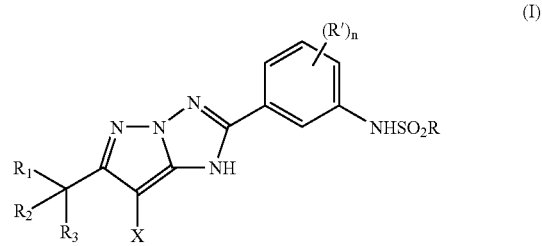

wherein
  $R_1$, $R_2$, and $R_3$ are independently selected unsubstituted alkyl groups comprising of 3 or less carbons with the proviso that one or more of the $R_1$, $R_2$, and $R_3$ groups can be joined to form a ring;
  R is a straight, cyclic or branched aliphatic carbon chain group and contains at least 9 aliphatic carbon atoms;
  each R' is an independently selected alkyl or halogen substituent, n is 0 to 3, and R', when present, does not include an R' in the ring position between the pyrazolotriazole nucleus and the sulfonamide; and
  X is hydrogen or halogen.

16 Claims, No Drawings

PHOTOGRAPHIC ELEMENT CONTAINING IMPROVED PYRAZOLOTRIAZOLE COUPLER

CROSS-REFERENCE TO RELATED APPLICATION

This application is a Continuation-in-Part of U.S. Ser. No. 10/661,119 entitled "PHOTOGRAPHIC ELEMENT CONTAINING IMPROVED PYRAZOLOTRIAZOLE COUPLER" filed on Sep. 12, 2003 now abandoned, the contents of which are incorporated herein by reference.

FIELD OF THE INVENTION

This invention relates to novel bicyclic pyrazolo dye-forming couplers, to photographic silver halide materials and processes using such couplers and to the dyes formed there from. The couplers contain a fully substituted carbon at the 6-position, hydrogen or a chlorine group at the 7-position, and a phenyl group at the 2-position substituted with a meta aliphatic or alicyclic sulfonamide substituent of more than eight carbon atoms.

BACKGROUND OF THE INVENTION

Color images are customarily obtained in the photographic art by reaction between an oxidation product of a silver halide developing agent and a dye-forming coupler. Pyrazolone couplers are useful for forming magenta dye images; however, such couplers have shortcomings with respect to color reproduction in that the unwanted absorption around 430 nm causes color turbidity. Bicyclic pyrazolo couplers, particularly pyrazolotriazole couplers, represent another class of couplers for this purpose. Examples of pyrazoloazole couplers are described in, for example, U.S. Pat. Nos. 4,443,536; 1,247,493; 1,252,418; and 1,398,979; and 4,665,015; 4,514,490; 4,621,046, 4,540,654; 4,590,153; 4,822,730 and European Patents 177, 765 and 119,860. One class of pyrazolotriazole couplers includes 1H-pyrazolo[3,2-c][1,2,4]triazole couplers and another includes 1H-pyrazolo[1,5-b][1,2,4]triazole couplers, such as described in European Patent 177765.

Pyrazoloazole couplers containing a t-butyl group at the 6-position are described in U.S. Pat. No. 4,882,266. and impart greater light stability to the resulting dyes. 1H-pyrazolo[1,5-b][1,2,4]triazole couplers with a fully substituted group in the 6-position and a phenyl substituent in the 2-position are described in EP 0571,959. U.S. Pat. No. 5,605,788 describes these types of couplers with aromatic sulfonamides on the 2-phenyl group. Similar couplers with aromatic and some aliphatic sulfonamides on the 2-phenyl ring are described in U.S. Pat. No. 6,232,055 and JP 08 146,575. While these sulfonamide substituted 2-phenyl substituted couplers have the advantage of light stability and hue, they are high melting solids and hard to disperse in common coupler solvents. In order for a coupler to be useful it must be soluble in the appropriate coupler solvents and not crystallize therefrom. When such crystallization occurs, loss in density and activity occurs and in the extreme case no dye is formed at all. Couplers with very high melting points of 140° C. or higher often show limited solubility in common coupler solvents. A problem to be solved is to provide couplers with the desirable sulfonamide substitution which have a reduced tendency to crystallize from the solvents they are dispersed in.

SUMMARY OF THE INVENTION

The invention provides a photographic element comprising a light-sensitive silver halide emulsion layer containing a 1H-pyrazolo[1,5-b][1,2,4]triazole coupler represented by structure (I):

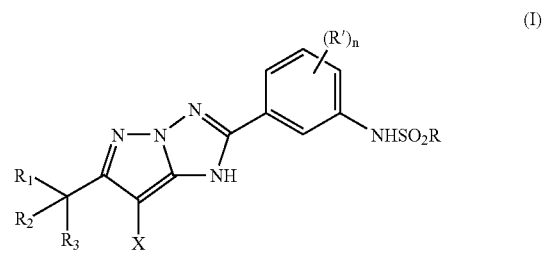

wherein $R_1$, $R_2$, and $R_3$ are independently selected unsubstituted alkyl groups comprising of 3 or less carbons with the proviso that one or more of the $R_1$, $R_2$, and $R_3$ groups can be joined to form a ring;

R is a straight, cyclic or branched aliphatic carbon chain group and contains at least 9 aliphatic carbon atoms;

each R' is an independently selected alkyl or halogen substituent, n is 0 to 3, and R', when present, does not include an R' in the ring position between the pyrazolotriazole nucleus and the sulfonamide; and X is hydrogen or halogen.

The element exhibits improved resistance to coupler crystallization and improved synthesis yields.

DETAILED DESCRIPTION OF THE INVENTION

The invention is generally described above. The couplers useful in the invention are represented by the following structure (I):

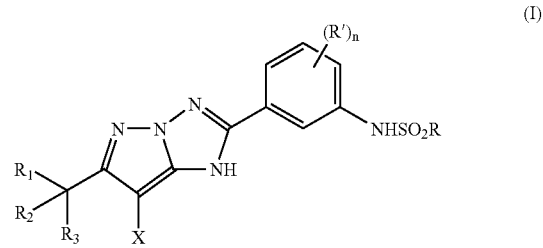

wherein $R_1$, $R_2$, and $R_3$ are independently selected unsubstituted alkyl groups comprising of 3 or less carbons with the proviso that one or more of the $R_1$, $R_2$, and $R_3$ groups can be joined to form a mono- or bicyclic ring. $R_1$, $R_2$, and $R_3$ can be methyl, ethyl, propyl and any two $R_1$, $R_2$, or $R_3$ groups can be joined to form a cyclohexyl, cyclopentyl, or cyclopropyl ring and all three $R_1$, $R_2$, and $R_3$ groups can be joined to form a [2.2.2]-bicyclo ring system. Preferably the $R_1$, $R_2$, and $R_3$ groups are methyl or are joined to form a [2.2.2]-bicyclo ring system. Most preferably the $R_1$, $R_2$, and $R_3$ groups are each methyl. The group represented by R is a straight, cyclic or branched aliphatic carbon chain, and comprising more than 8 carbon atoms. Preferably, there is no substitution on R or substitution with ethers, halogens, or sulfones. Preferably the R group contains at least 9 and desirably 9 to 25 carbons and more preferably 10 to 18 and most preferably 12 to 16. When present, the R' group is an alkyl or halogen substituent and is more preferably, chlorine, or an alkyl group with less than 4 carbons and is most preferably methyl. n is 0, 1, 2, or 3, but preferably 0 or 1 and most preferably 0. R', when present, does not include a substituent ortho to both the pyrazolotriazole and the sulfonamide. X is hydrogen or halogen. Preferably X is hydrogen or chloro and most preferably X is chloro.

The presence of a group ortho to both the pyrazolotriazole nucleus and the sulfonamide is undesirable because the synthetic yields are poorer which leads to greater waste, more difficult purification and higher cost of the coupler and photographic element. Even though there are several variations of the synthesis of 2-aryl substituted pyrazolotriazoles, they all involve the ring closure step to form the pyrazolotrazole nucleus:

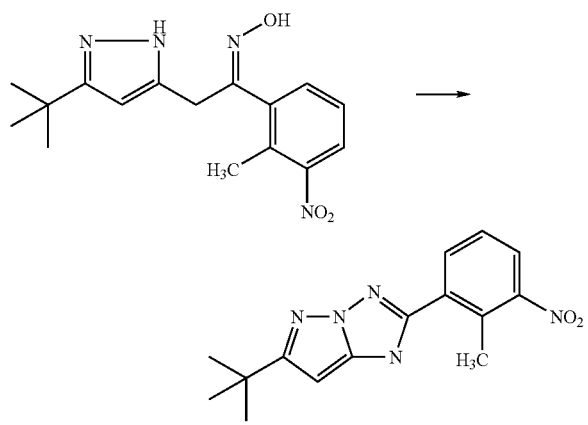

This process is sensitive the presence of the substituent in position between the pyrazolotriazole ring and the nitro group such that the yield of ring closure is significantly lower making these derivatives less desirable. The Examples that follow demonstrate this fact.

Representative couplers of the invention are as follows:

M-1

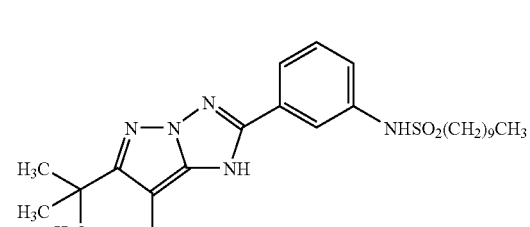

M-2

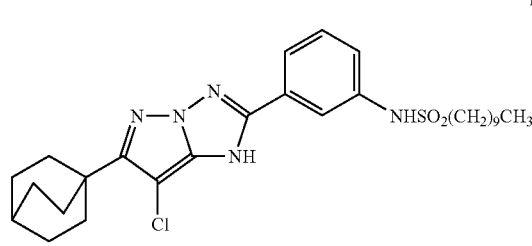

-continued

M-3

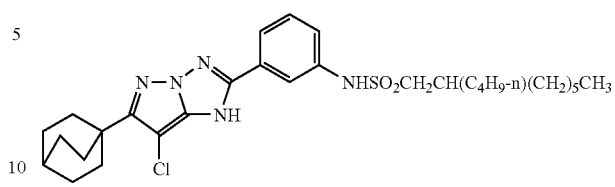

M-4

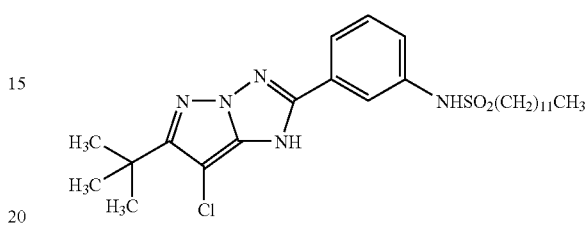

M-5

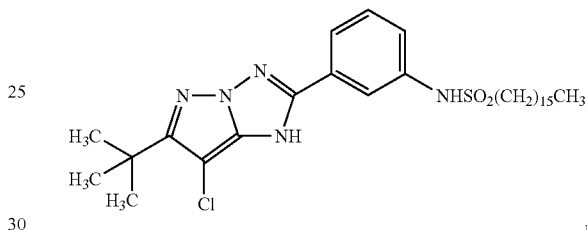

M-6

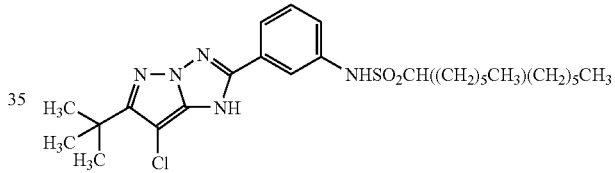

M-7

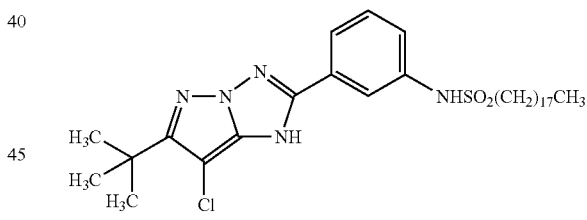

M-8

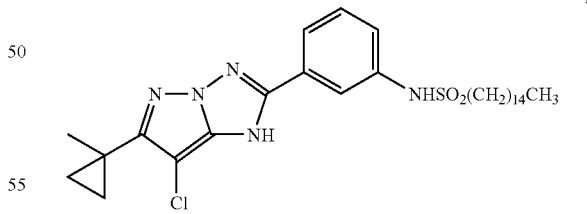

M-9

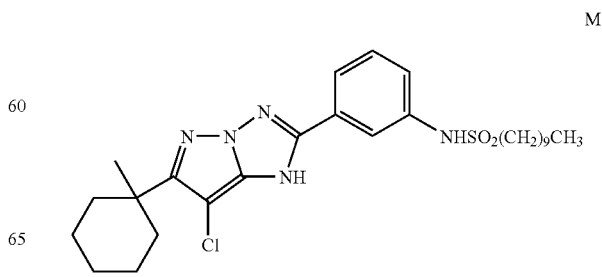

-continued

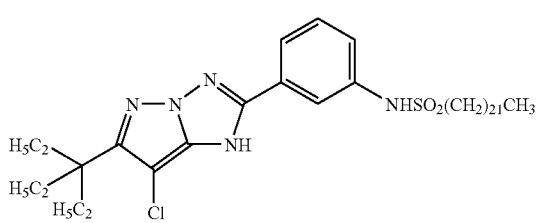
M-10

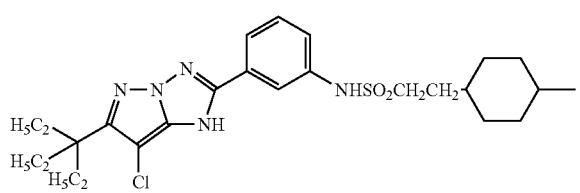
M-11

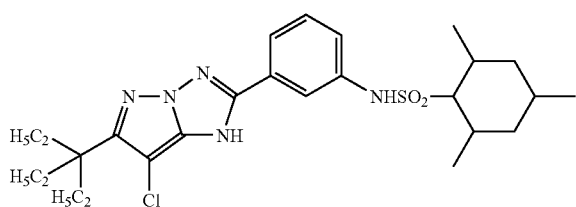
M-12

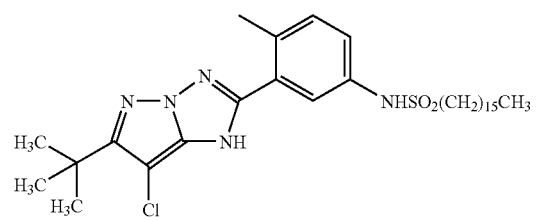
M-13

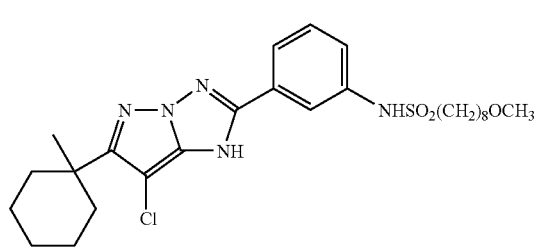
M-14

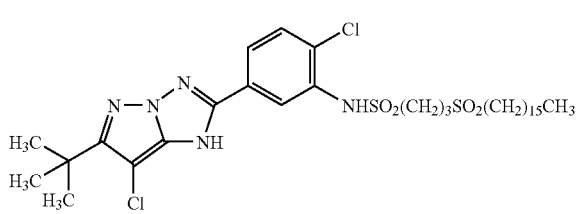
M-15

-continued

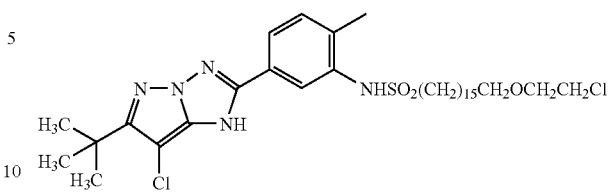
M-16

Typically, couplers are incorporated in a silver halide emulsion layer in a mole ratio to silver of 0.05 to 1.0 and generally 0.1 to 0.5. Usually the couplers are dispersed in a high-boiling organic solvent in a weight ratio of solvent to coupler of 0.1 to 10.0 and typically 0.1 to 2.0 although dispersions using no permanent coupler solvent are sometimes employed.

Unless otherwise specifically stated, use of the term "substituted" or "substituent" means any group or atom other than hydrogen. Unless otherwise provided, when a group, compound or formula containing a substitutable hydrogen is referred to, it is also intended to encompass not only the unsubstituted form, but also form further substituted with any substituent group or groups as herein mentioned, so long as the substituent does not destroy properties necessary for utility. Suitably, a substituent group may be halogen or may be bonded to the remainder of the molecule by an atom of carbon, silicon, oxygen, nitrogen, phosphorous, or sulfur. The substituent may be, for example, halogen, such as chloro, bromo or fluoro; nitro; hydroxyl; cyano; carboxyl; or groups-which may be further substituted, such as alkyl, including straight or branched chain or cyclic alkyl, such as methyl, trifluoromethyl, ethyl, t-butyl, 3-(2,4-di-t-pentylphenoxy) propyl, cyclohexyl, and tetradecyl; alkenyl, such as ethylene, 2-butene; alkoxy, such as methoxy, ethoxy, propoxy, butoxy, 2-methoxyethoxy, sec-butoxy, hexyloxy, 2-ethylhexyloxy, tetradecyloxy, 2-(2,4-di-t-pentylphenoxy) ethoxy, and 2-dodecyloxyethoxy; aryl such as phenyl, 4-t-butylphenyl, 2,4,6-trimethylphenyl, naphthyl; aryloxy, such as phenoxy, 2-methylphenoxy, alpha- or beta-naphthyloxy, and 4-tolyloxy; carbonamido, such as acetamido, benzamido, butyramido, tetradecanamido, alpha-(2,4-di-t-pentyl-phenoxy)acetamido, alpha-(2,4-di-t-pentylphenoxy)butyramido, alpha-(3-pentadecylphenoxy)-hexanamido, alpha-(4-hydroxy-3-t-butylphenoxy)-tetradecanamido, 2-oxo-pyrrolidin-1-yl, 2-oxo-5-tetradecylpyrrolin-1-yl, N-methyltetradecanamido, N-succinimido, N-phthalimido, 2,5-dioxo-1-oxazolidinyl, 3-dodecyl-2,5-dioxo-1-imidazolyl, and N-acetyl-N-dodecylamino, ethoxycarbonylamino, phenoxycarbonylamino, benzyloxycarbonylamino, hexadecyloxycarbonylamino, 2,4-di-t-butylphenoxycarbonylamino, phenylcarbonylamino, 2,5-(di-t-pentylphenyl) carbonylamino, p-dodecyl-phenylcarbonylamino, p-tolyl-carbonylamino, N-methylureido, N,N-dimethylureido, N-methyl-N-dodecylureido, N-hexadecylureido, N,N-dioctadecylureido, N,N-dioctyl-N'-ethylureido, N-phenylureido, N,N-diphenylureido, N-phenyl-N-p-tolylureido, N-(m-hexadecylphenyl)ureido, N,N-(2,5-di-t-pentylphenyl)-N'-ethylureido, and t-butylcarbonamido; sulfonamido, such as methylsulfonamido, benzenesulfonamido, p-tolylsulfonamido, p-dodecylbenzenesulfonamido, N-methyltetradecyl-sulfonamido, N,N-dipropyl-sulfamoylamino, and hexadecylsulfonamido; sulfamoyl, such as N-methylsulfamoyl, N-ethylsulfamoyl, N,N-dipropylsulfamoyl, N-hexadecylsulfamoyl, N,N-dimethylsulfamoyl; N-[3-(dodecyloxy)propyl]

sulfamoyl, N-[4-(2,4-di-t-pentylphenoxy)butyl]sulfamoyl, N-methyl-N-tetradecylsulfamoyl, and N-dodecylsulfamoyl; carbamoyl, such as N-methylcarbamoyl, N,N-dibutylcarbamoyl, N-octadecylcarbamoyl, N-[4-(2,4-di-t-pentylphenoxy)butyl]carbamoyl, N-methyl-N-tetradecylcarbamoyl, and N,N-dioctylcarbamoyl; acyl, such as acetyl, (2,4-di-t-amylphenoxy)acetyl, phenoxycarbonyl, p-dodecyloxyphenoxycarbonyl methoxycarbonyl, butoxycarbonyl, tetradecyloxycarbonyl, ethoxycarbonyl, benzyloxycarbonyl, 3-pentadecyloxycarbonyl, and dodecyloxycarbonyl; sulfonyl, such as methoxysulfonyl, octyloxysulfonyl, tetradecyloxysulfonyl, 2-ethylhexyloxysulfonyl, phenoxysulfonyl, 2,4-di-t-pentylphenoxysulfonyl, methylsulfonyl, octylsulfonyl, 2-ethylhexylsulfonyl, dodecylsulfonyl, hexadecylsulfonyl, phenylsulfonyl, 4-nonylphenylsulfonyl, and p-tolylsulfonyl; sulfonyloxy, such as dodecylsulfonyloxy, and hexadecylsulfonyloxy; sulfinyl, such as methylsulfinyl, octylsulfinyl, 2-ethylhexylsulfinyl, dodecylsulfinyl, hexadecylsulfinyl, phenylsulfinyl, 4-nonylphenylsulfinyl, and p-tolylsulfinyl; thio, such as ethylthio, octylthio, benzylthio, tetradecylthio, 2-(2,4-di-t-pentylphenoxy)ethylthio, phenylthio, 2-butoxy-5-t-octylphenylthio, and p-tolylthio; acyloxy, such as acetyloxy, benzoyloxy, octadecanoyloxy, p-dodecylamidobenzoyloxy, N-phenylcarbamoyloxy, N-ethylcarbamoyloxy, and cyclohexylcarbonyloxy; amine, such as phenylanilino, 2-chloroanilino, diethylamine, dodecylamine; imino, such as 1 (N-phenylimido)ethyl, N-succinimido or 3-benzylhydantoinyl; phosphate, such as dimethylphosphate and ethylbutylphosphate; phosphite, such as diethyl and dihexylphosphite; a heterocyclic group, a heterocyclic oxy group or a heterocyclic thio group, each of which may be substituted and which contain a 3 to 7 membered heterocyclic ring composed of carbon atoms and at least one hetero atom selected from the group consisting of oxygen, nitrogen and sulfur, such as 2-furyl, 2-thienyl, 2-benzimidazolyloxy or 2-benzothiazolyl; quaternary ammonium, such as triethylammonium; and silyloxy, such as trimethylsilyloxy.

If desired, the substituents may themselves be further substituted one or more times with the described substituent groups. The particular substituents used may be selected by those skilled in the art to attain the desired desirable properties for a specific application and can include, for example, hydrophobic groups, solubilizing groups, blocking groups, and releasing or releasable groups. When a molecule may have two or more substituents, the substituents may be joined together to form a ring such as a fused ring unless otherwise provided. Generally, the above groups and substituents thereof may include those having up to 48 carbon atoms, typically 1 to 36 carbon atoms and usually less than 24 carbon atoms, but greater numbers are possible depending on the particular substituents selected.

The materials useful in the invention can be used in any of the ways and in any of the combinations known in the art. Typically, the invention materials are incorporated in a melt and coated as a layer described herein on a support to form part of a photographic element. When the term "associated" is employed, it signifies that a reactive compound is in or adjacent to a specified layer where, during processing, it is capable of reacting with other components.

To control the migration of various components, it may be desirable to include a high molecular weight hydrophobe or "ballast" group in coupler molecules. Representative ballast groups include substituted or unsubstituted alkyl or aryl groups containing 8 to 48 carbon atoms. Representative substituents on such groups include alkyl, aryl, alkoxy, aryloxy, alkylthio, hydroxy, halogen, alkoxycarbonyl, aryloxycarbonyl, carboxy, acyl, acyloxy, amino, anilino, carbonamido, carbamoyl, alkylsulfonyl, arylsulfonyl, sulfonamido, and sulfamoyl groups wherein the substituents typically contain 1 to 42 carbon atoms. Such substituents can also be further substituted.

The photographic elements can be single color elements or multicolor elements. Multicolor elements contain image dye-forming units sensitive to each of the three primary regions of the spectrum. Each unit can comprise a single emulsion layer or multiple emulsion layers sensitive to a given region of the spectrum. The layers of the element, including the layers of the image-forming units, can be arranged in various orders as known in the art. In an alternative format, the emulsions sensitive to each of the three primary regions of the spectrum can be disposed as a single segmented layer.

A typical multicolor photographic element comprises a support bearing a cyan dye image-forming unit comprising one or more red-sensitive silver halide emulsion layers, each layer having associated therewith or preferably containing a cyan dye-forming coupler, a magenta dye image-forming unit comprising one or more green-sensitive silver halide emulsion layers, each layer having associated therewith or preferably containing a magenta dye-forming coupler, and a yellow dye image-forming unit comprising one or more blue-sensitive silver halide emulsion layers, each layer having associated therewith or preferrably containing a yellow dye-forming coupler. The element can contain additional layers, such as filter layers, interlayers, overcoat layers, and subbing layers.

In the following discussion of suitable materials for use in the emulsions and elements of this invention, reference will be made to *Research Disclosure*, September 1996, Item 38957, available as described above, which is referred to herein by the term "Research Disclosure". The Sections hereinafter referred to are Sections of the Research Disclosure.

Except as provided, the silver halide emulsion containing elements employed in this invention can be either negative-working or positive-working as indicated by the type of processing instructions (i.e. color negative, reversal, or direct positive processing) provided with the element. Suitable emulsions and their preparation as well as methods of chemical and spectral sensitization are described in Sections I through V. Various additives such as UV dyes, brighteners, antifoggants, stabilizers, light absorbing and scattering materials, and physical property modifying addenda such as hardeners, coating aids, plasticizers, lubricants and matting agents are described, for example, in Sections II and VI through VIII. Color materials are described in Sections X through XIII. Suitable methods for incorporating couplers and dyes, including dispersions in organic solvents, are described in Section X(E). Scan facilitating is described in Section XIV. Supports, exposure, development systems, and processing methods and agents are described in Sections XV to XX. The information contained in the September 1994 *Research Disclosure*, Item No. 36544 referenced above, is updated in the September 1996 *Research Disclosure*, Item No. 38957. Certain desirable photographic elements and processing steps, including those useful in conjunction with color reflective prints, are described in *Research Disclosure*, Item 37038, February 1995.

Coupling-off groups are well known in the art. Such groups can determine the chemical equivalency of a coupler, i.e., whether it is a 2-equivalent or a 4-equivalent coupler, or modify the reactivity of the coupler. Such groups can advantageously affect the layer in which the coupler is coated, or other layers in the photographic recording material, by performing, after release from the coupler, functions such as dye formation, dye hue adjustment, development acceleration or inhibition, bleach acceleration or inhibition, electron transfer facilitation, and color correction.

The presence of hydrogen at the coupling site provides a 4-equivalent coupler, and the presence of another coupling-off group usually provides a 2-equivalent coupler. Representative classes of such coupling-off groups include, for example, chloro, alkoxy, aryloxy, hetero-oxy, sulfonyloxy, acyloxy, acyl, heterocyclyl, sulfonamido, mercaptotetrazole, benzothiazole, mercaptopropionic acid, phosphonyloxy, arylthio, and arylazo. These coupling-off groups are described in the art, for example, in U.S. Pat. Nos. 2,455,169, 3,227,551, 3,432,521, 3,476,563, 3,6.17,291, 3,880,661, 4,052,212 and 4,134,766; and in UK. Patents and published application Nos. 1,466,728, 1,531,927, 1,533,039, 2,006,755A and 2,017,704A.

Image dye-forming couplers may be included in the element such as couplers that form cyan dyes upon reaction with oxidized color developing agents which are described in such representative patents and publications as: "Farbkuppler-eine Literature Ubersicht," published in Agfa Mitteilungen, Band III, pp. 156-175 (1961) as well as in U.S. Pat. Nos. 2,367,531; 2,423,730; 2,474,293; 2,772,162; 2,895,826; 3,002,836; 3,034,892; 3,041,236; 4,333,999; 4,746,602; 4,753,871; 4,770,988; 4,775,616; 4,818,667; 4,818,672; 4,822,729; 4,839,267; 4,840,883; 4,849,328; 4,865,961; 4,873,183; 4,883,746; 4,900,656; 4,904,575; 4,916,051; 4,921,783; 4,923,791; 4,950,585; 4,971,898; 4,990,436; 4,996,139; 5,008,180; 5,015,565; 5,011,765; 5,011,766; 5,017,467; 5,045,442; 5,051,347; 5,061,613; 5,071,737; 5,075,207; 5,091,297; 5,094,938; 5,104,783; 5,178,993; 5,813,729; 5,187,057; 5,192,651; 5,200,305 5,202,224; 5,206,130; 5,208,141; 5,210,011; 5,215,871; 5,223,386; 5,227,287; 5,256,526; 5,258,270; 5,272,051; 5,306,610; 5,326,682; 5,366,856; 5,378,596; 5,380,638; 5,382,502; 5,384,236; 5,397,691; 5,415,990; 5,434,034; 5,441,863; EPO 0 246 616; EPO 0 250 201; EPO 0 271 323; EPO 0 295 632; EPO 0 307 927; EPO 0 333 185; EPO 0 378 898; EPO 0 389 817; EPO 0 487 111; EPO 0 488 248; EPO 0 539 034; EPO 0 545 300; EPO 0 556 700; EPO 0 556 777; EPO 0 556 858; EPO 0 569 979; EPO 0 608 133; EPO 0 636 936; EPO 0 651 286; EPO 0 690 344; German OLS 4,026,903; German OLS 3,624,777. and German OLS 3,823,049. Typically such couplers are phenols, naphthols, or pyrazoloazoles.

Couplers that form magenta dyes upon reaction with oxidized color developing agent are described in such representative patents and publications as: "Farbkuppler-eine Literature Ubersicht," published in Agfa Mitteilungen, Band III, pp. 126-156 (1961) as well as U.S. Pat. Nos. 2,311,082 and 2,369,489; 2,343,701; 2,600,788; 2,908,573; 3,062,653; 3,152,896; 3,519,429; 3,758,309; 3,935,015; 4,540,654; 4,745,052; 4,762,775; 4,791,052; 4,812,576; 4,835,094; 4,840,877; 4,845,022; 4,853,319; 4,868,099; 4,865,960; 4,871,652; 4,876,182; 4,892,805; 4,900,657; 4,910,124; 4,914,013; 4,921,968; 4,929,540; 4,933,465; 4,942,116; 4,942,117; 4,942,118; 4,959,480; 4,968,594; 4,988,614; 4,992,361; 5,002,864; 5,021,325; 5,066,575; 5,068,171; 5,071,739; 5,100,772; 5,110,942; 5,116,990; 5,118,812; 5,134,059; 5,155,016; 5,183,728; 5,234,805; 5,235,058; 5,250,400; 5,254,446; 5,262,292; 5,300,407; 5,302,496; 5,336,593; 5,350,667; 5,395,968; 5,354,826; 5,358,829; 5,368,998; 5,378,587; 5,409,808; 5,411,841; 5,418,123; 5,424,179; EPO 0 257 854; EPO 0 284 240; EPO 0 341 204; EPO 347,235; EPO 365,252; EPO 0 422 595; EPO 0 428 899; EPO 0 428 902; EPO 0 459 331; EPO 0 467 327; EPO 0 476 949; EPO 0 487 081; EPO 0 489 333; EPO 0 512 304; EPO 0 515 128; EP 0 534 703; EPO 0 554 778; EPO 0 558 145; EPO 0 571 959; EPO 0 583 832; EPO 0 583 834; EPO 0 584 793; EPO 0 602 748; EPO 0 602 749; EPO 0 605 918; EPO 0 622 672; EPO 0 622 673; EPO 0 629 912; EPO 0 646 841, EPO 0 656 561; EPO 0 660 177; EPO 0 686 872; WO 90/10253; WO 92/09010; WO 92/10788; WO 92/12464; WO 93/01523; WO 93/02392; WO 93/02393; WO 93/07534; UK Application 2,244,053; Japanese Application 03192-350; German OLS 3,624,103; German OLS 3,912,265; and German OLS 40 08 067. Typically such couplers are pyrazolones, pyrazoloazoles, or pyrazolobenzimidazoles that form magenta dyes upon reaction with oxidized color developing agents.

Couplers that form yellow dyes upon reaction with oxidized color developing agent are described in such representative patents and publications as: "Farbkuppler-eine Literature Ubersicht," published in Agfa Mitteilungen; Band III; pp. 112-126 (1.961); as well as U.S. Pat. Nos. 2,298,443; 2,407,210; 2,875,057; 3,048,194; 3,265,506; 3,447,928; 4,022,620; 4,443,536; 4,758,501; 4,791,050; 4,824,771; 4,824,773; 4,855,222; 4,978,605; 4,992,360; 4,994,361; 5,021,333; 5,053,325; 5,066,574; 5,066,576; 5,100,773; 5,118,599; 5,143,823; 5,187,055; 5,190,848; 5,213,958; 5,215,877; 5,215,878; 5,217,857; 5,219,716; 5,238,803; 5,283,166; 5,294,531; 5,306,609; 5,328,818; 5,336,591; 5,338,654; 5,358,835; 5,358,838; 5,360,713; 5,362,617; 5,382,506; 5,389,504; 5,399,474; 5,405,737; 5,411,848; 5,427,898; EPO 0 327 976; EPO 0 296 793; EPO 0 365 282; EPO 0 379 309; EPO 0 415 375; EPO 0 437 818; EPO 0 447 969; EPO 0 542 463; EPO 0 568 037; EPO 0 568 196; EPO 0 568 777; EPO 0 570 006; EPO 0 573 761; EPO 0 608 956; EPO 0 608 957; and EPO 0 628 865. Such couplers are typically open chain ketomethylene compounds.

Couplers that form colorless products upon reaction with oxidized color developing agent are described in such representative patents as: UK. 861,138; U.S. Pat. Nos. 3,632,345; 3,928,041; 3,958,993 and 3,961,959. Typically such couplers are cyclic carbonyl containing compounds that form colorless products on reaction with an oxidized color developing agent.

Couplers that form black dyes upon reaction with oxidized color developing agent are described in such representative patents as U.S. Pat. Nos. 1,939,231; 2,181,944; 2,333,106; and 4,126,461; German OLS No. 2,644,194 and German OLS No. 2,650,764. Typically, such couplers are resorcinols or m-aminophenols that form black or neutral products on reaction with oxidized color developing agent.

In addition to the foregoing, so-called "universal" or "washout" couplers may be employed. These couplers do not contribute to image dye-formation. Thus, for example, a naphthol having an unsubstituted carbamoyl or one substituted with a low molecular weight substituent at the 2- or 3-position may be employed. Couplers of this type are described, for example, in U.S. Pat. Nos. 5,026,628, 5,151,343, and 5,234,800.

It may be useful to use a combination of couplers any of which may contain known ballasts or coupling-off groups such as those described in U.S. Pat. No. 4,301,235; U.S. Patent 4,853,319 and U.S. Patent 4,351,897. The coupler may contain solubilizing groups such as described in U.S. Pat. No. 4,482,629. The coupler may also be used in association with "wrong" colored couplers (e.g. to adjust levels of interlayer correction) and, in color negative applications, with masking couplers such as those described in EP 213.490; Japanese Published Application 58-172,647; U.S. Pat. Nos. 2,983,608; 4,070,191; and 4,273,861; German Applications DE 2,706,117 and DE 2,643,965; UK. Patent 1,530,272; and Japanese Application 58-113935. The masking couplers may be shifted or blocked, if desired.

The invention may also be used in combination with filter dye layers comprising colloidal silver sol or yellow, cyan, and/or magenta filter dyes, either as oil-in-water dispersions, latex dispersions or as solid particle dispersions. Additionally, they may be used with "smearing" couplers (e.g. as described in U.S. Pat. No. 4,366,237; EP 96,570; U.S. Pat. Nos. 4,420,556; and U.S. 4,543,323.) Also, the materials useful in the invention may be blocked or coated in protected form as described, for example, in Japanese Application 61/258,249 or U.S. Pat. No. 5,019,492.

It is particularly contemplated that the present invention may be employed to obtain reflection color prints as described in *Research Disclosure*, November 1979, Item 18716, available from Kenneth Mason Publications, Ltd, Dudley Annex, 12a North Street, Emsworth, Hampshire P0101 7DQ, England. Materials useful in the invention maybe coated on pH adjusted support as described in U.S. Pat. No. 4,917,994; on a support with reduced oxygen permeability (EP 553,339); with epoxy solvents (EP 164, 961); with nickel complex stabilizers (U.S. Pat. Nos. 4,346, 165; U.S. 4,540,653 and U.S. 4,906,559 for example); with ballasted chelating agents such as those in U.S. Pat. No. 4,994,359 to reduce sensitivity to polyvalent cations such as calcium; and with stain reducing compounds such as described in U.S. Pat. No. 5,068,171. Other compounds useful in combination with the invention are disclosed in Japanese Published Applications described in Derwent Abstracts having accession numbers as follows: 90-072,629, 90-072,630; 90-072,631; 90-072,632; 90-072,633; 90-072, 634; 90-077,822; 90-078,229; 90-078,230; 90-079,336; 90-079,337; 90-079,338; 90-079,690; 90-079,691; 90-080, 487; 90-080,488; 90-080,489; 90-080,490; 90-080,491; 90-080,492; 90-080,494; 90-085,928; 90-086,669; 90-086, 670; 90-087,360; 90-087,361; 90-087,362; 90-087,363; 90-087,364; 90-088,097; 90-093,662; 90-093,663; 90-093, 664; 90-093,665; 90-093,666; 90-093,668; 90-094,055; 90-094,056; 90-103,409; 83-62,586; 83-09,959.

Conventional radiation-sensitive silver halide emulsions can be employed in the practice of this invention. Such emulsions are illustrated by *Research Disclosure*, Item 38755, September 1996, I. Emulsion grains and their preparation.

Photographic elements can be exposed to actinic radiation, typically in the visible region of the spectrum, to form a latent image and can then be processed to form a visible dye image. Processing to form a visible dye image includes the step of contacting the element with a color-developing agent to reduce developable silver halide and oxidize the color-developing agent. Oxidized color developing agent in turn reacts with the coupler to yield a dye. If desired "Redox Amplification" as described in Research Disclosure XVIIIB (5) may be used.

A "color negative element" utilizes negative-working silver halide and provides a negative image upon processing. A first type of such element is a capture element, which is a color negative film that is designed for capturing an image in negative form rather than for viewing an image. A second type of such an element is a direct-view element that is designed, at least in part, for providing a positive image viewable by humans.

In the capture element, speed (the sensitivity of the element to low light conditions) is usually critical to obtaining sufficient image in such elements. Such elements are typically silver bromoiodide emulsions coated on a transparent support and are sold packaged with instructions to process in known color negative processes such as the Kodak C-41 process as described in The British Journal of Photography Annual of 1988, pages 191–198. If a color negative film element is to be subsequently employed to generate a viewable projection print as for a motion picture, a process such as the Kodak ECN-2 process described in the H-24 Manual available from Eastman Kodak Co. may be employed to provide the color negative image on a transparent support. Color negative development times are typically 3' 15" or less and desirably 90 or even 60 seconds or less.

A direct-view photographic element is one which yields a color image that is designed for human viewing (1) by reflected light, such as a photographic paper print, (2) by transmitted light, such as a display transparency, or (3) by projection, such as a color slide or a motion picture print. These direct-view elements may be exposed and processed in a variety of ways. For example, paper prints, display transparencies, and motion picture prints are typically produced by digitally printing or by optically printing an image from a color negative onto the direct-viewing element and processing though an appropriate negative-working photographic process to give a positive color image. The element may be sold packaged with instructions for digital printing or for processing using a color negative optical printing process, for example the Kodak RA-4 process, as generally described in PCT WO 87/04534 or U.S. Pat. No. 4,975,357, to form a positive image. Color projection prints may be processed, for example, in accordance with the Kodak ECP-2 process as described in the H-24 Manual. Color print development times are typically 90 seconds or less and desirably 45 or even 30 seconds or less. Color slides may be produced in a similar manner but are more typically produced by exposing the film directly in a camera and processing through a reversal color process or a direct positive process to give a positive color image. The foregoing images may also be produced by alternative processes such as digital printing.

Each of these types of photographic elements has its own particular requirements for dye hue, but in general they all require cyan dyes whose absorption bands are less deeply absorbing (that is, shifted away from the red end of the spectrum) than color negative films. This is because dyes in direct-view elements are selected to have the best appearance when viewed by human eyes, whereas the dyes in image capture materials are designed to best match the needs of the printing process.

A reversal element is capable of forming a positive image without optical printing. To provide a positive (or reversal) image, the color development step is preceded by development with a non-chromogenic developing agent to develop exposed silver halide, but not form dye, and followed by uniformly fogging the element to render unexposed silver halide developable. Such reversal elements are typically sold packaged with instructions to process using a color reversal process such as the Kodak E-6 process as described in The British Journal of Photography Annual of 1988, page 194. Alternatively, a direct positive emulsion can be employed to obtain a positive image.

The above elements are typically sold with instructions to process using the appropriate method such as the mentioned color negative (Kodak C-41), color print (Kodak RA-4), or reversal (Kodak E-6) process.

The photographic element of the invention can be incorporated into exposure structures intended for repeated use or exposure structures intended for limited use, variously referred to by names such as "single use cameras", "lens with film", or "photosensitive material package units".

Preferred color developing agents are p-phenylenediamines such as:

4-amino-N,N-diethylaniline hydrochloride,
4-amino-3-methyl-N,N-diethylaniline hydrochloride,
4-amino-3-methyl-N-ethyl-N-(2-methanesulfonamidoethyl) aniline sesquisulfate hydrate,
4-amino-3-methyl-N-ethyl-N-(2-hydroxyethyl)aniline sulfate,
4-amino-3-(2-methanesulfonamidoethyl)-N,N-diethylaniline hydrochloride, and 4-amino-N-ethyl-N-(2-methoxyethyl)-m-toluidine di-p-toluene sulfonic acid.

Development is usually followed by the conventional steps of bleaching, fixing, or bleach-fixing, to remove silver or silver halide, washing, and drying.

The entire contents of the patents and other publications referred to in this specification are incorporated herein by reference.

Synthesis of Couplers of the Invention

Compounds of the invention can be synthesized by methods known in the art. Intermediate i can be synthesized by the method found in JP 2002318446 and JP 2001242606.

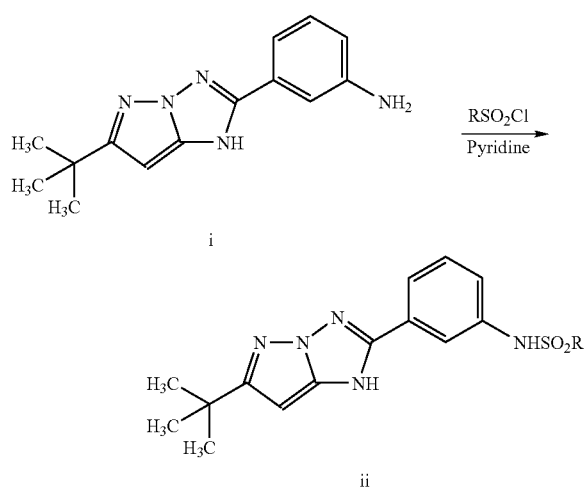

The ballasts are attached using the appropriate sulfonyl chloride in the presence of pyridine to yield ii by any of the methods common in the art. The final coupler is obtained by chlorination by methods common in the art. The synthesis of M-1 is shown below.

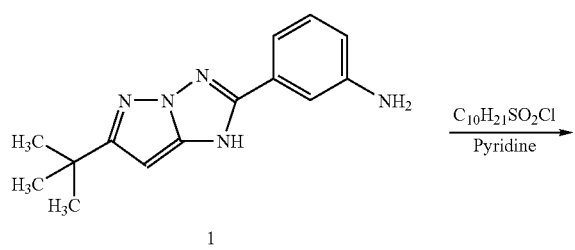

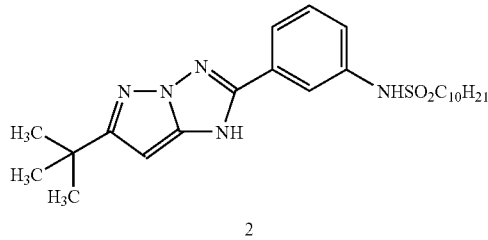

2.0 g of 1 (0.00783 mol) and 0.65 ml pyridine (0.00800 mol) were dissolved in 10 ml THF and 1.9 g (0.00783 mol) dodecylsulfonyl chloride added and the reaction stirred room temperature overnight. The reaction mixture was added to dilute HCl and ethyl acetate added. The organic layer was separated and washed with water three times, dried over magnesium sulfate and concentrated to an oil which when stirred with acetonitrile yielded 2 as a salmon colored solid. This solid was dissolved in 10 ml THF and 0.54 g (0.00403 mol) N-chlorosuccinimide added and stirred 30 minutes at room temperature. 1.0 g hypo was dissolved in 1 ml water and added to the reaction mixture and the reaction stirred vigorously for 15 minutes. The reaction added to water and ethyl acetate added. After shaking the organic layer was separated and washed with water three times, dried over magnesium sulfate and concentrated to an oil which was then stirred with acetonitrile to yield, after filtering, 0.9 g of M-1 as a white solid, mp 116–118° C., nmr and ms consistent with desired product.

Crystallization Properties of Compounds of the Invention

The tendency of various couplers to crystallize in coupler solvent and consequently in film was measured. Dispersions of couplers useful in the invention as well as comparative couplers were prepared as follows. 0.020 g of the couplers were dissolved in 0.080 g of a 1:1 mixture of coupler solvents S-1 and S-2 with gentle heating (60° C.) and the solutions were allowed to stand at room temperature. After 48 hours and one week the presence of crystals was determined by visual inspection. The results are shown in the following table. The melting points, which roughly correlate with the solubility of the couplers in photographic dispersions are also shown.

| | | MPt[1] | Crystals?[2] |
|---|---|---|---|
| M-1 | (structure shown) | 116 | NO |

-continued

| | | MPt[1] | Crystals?[2] |
|---|---|---|---|
| M-4 | *structure* | 124 | NO |
| M-5 | *structure* | 124 | NO |
| M-7 | *structure* | 136 | NO |
| M-8 | *structure* | glass | NO |
| C-1 | *structure* | 207 | YES |
| C-2 | *structure* | 140 | YES |
| C-3 | *structure* | 226 | YES |

-continued

| | MPt[1] | Crystals?[2] |
|---|---|---|
| C-4 | 240 | YES |
| C-5 | 188 | YES |
| C-6 | 271 | YES |
| C-7 | 178 | YES |
| C-8 | 171 | YES |
| C-9 | 177 | YES |

[1]Melting point in ° C.
[2]These observations were the same after 48 hrs and 1 week.

The solvents used were as follows:

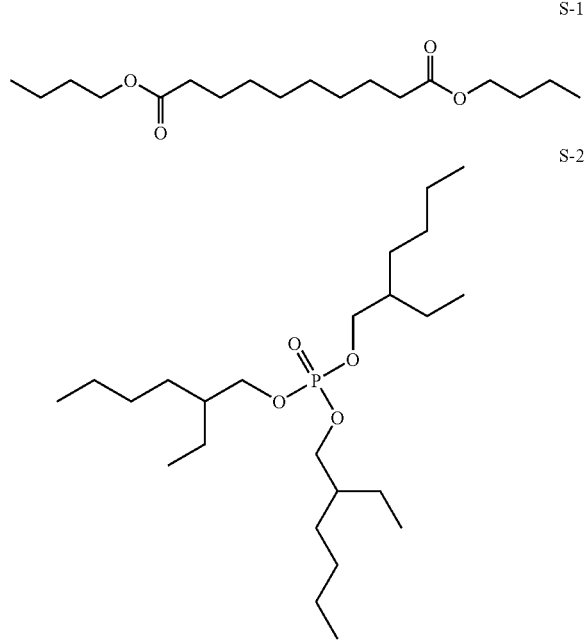

S-1

S-2

It can be seen that, for the couplers useful in the invention, no crystals were observed even after one week while for comparative couplers crystals were observed after 48 hours. Sample C-1 bears only a C-8 R group. Samples C-2 through C-6 bear aromatic R groups. Samples C-7 and C-8 bear aliphatic R groups with unpermitted amide or sulfonamide groups. Thus it is apparent that the solubility of the couplers useful in the invention is greatly improved over similarly substituted couplers as well as those presently used in the art such as C-9.

Nucleus and the Sulfonamide Substituent on Yield

EXAMPLES

Synthesis Examples were carried out in the same manner as above using four different intermediates to accomplish the ring closure step.

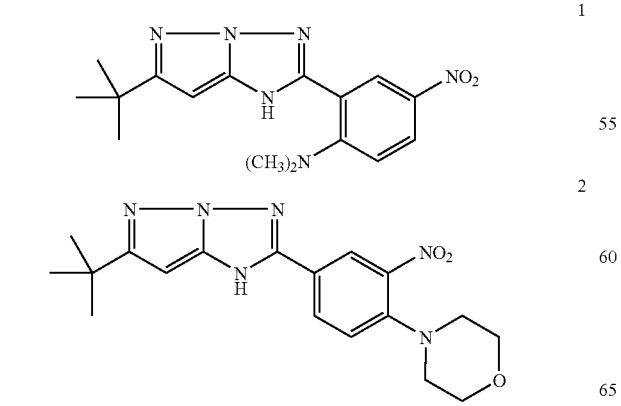

1

2

3

-continued

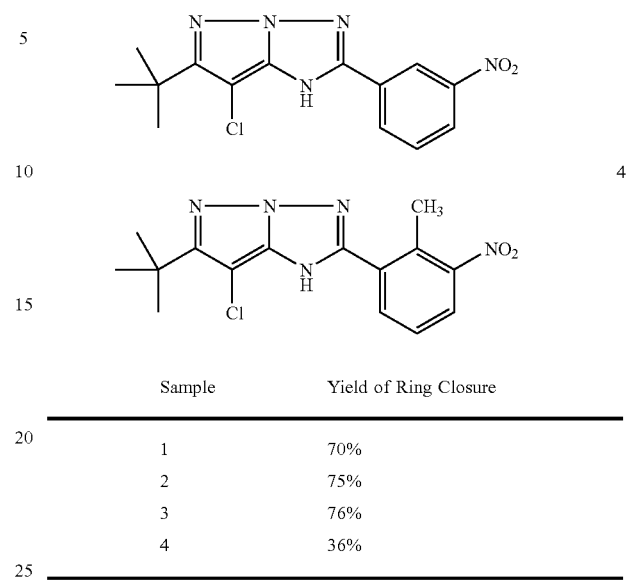

4

| Sample | Yield of Ring Closure |
|---|---|
| 1 | 70% |
| 2 | 75% |
| 3 | 76% |
| 4 | 36% |

As can be seen from the data, the presence of a substituent group between the pyrazolotriazole nucleus and the N substituent, as in Sample 4, is undesirable because the synthetic yields are much poorer which leads to greater waste, more difficult purification and higher cost of the coupler and photographic element. The syntheses involve the ring closure step to form the pyrazolotrazole nucleus as follows:

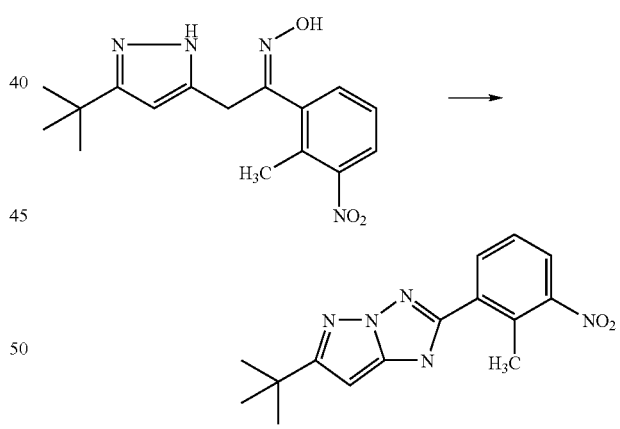

This process is sensitive the presence of the substituent in position between the pyrazolotriazole ring and the nitro group such that the yield of ring closure is significantly lower making these derivatives less desirable. This data substantiates the need to have no substituent in the ring position between the pyrazolotriazole nucleus and the sulfonamide.

The invention has been described in detail with particular reference to certain preferred embodiments thereof, but it will be understood that variations and modifications can be effected within the spirit and scope of the invention.

What is claimed is:

1. A photographic element comprising a light-sensitive silver halide emulsion layer containing a 1H-pyrazolo[1,5-b][1,2,4]triazole coupler represented by structure (I):

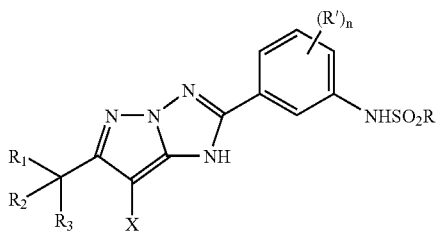

(I)

wherein
- $R_1$, $R_2$, and $R_3$ are independently selected unsubstituted alkyl groups comprising of 3 or less carbons with the proviso that one or more of the $R_1$, $R_2$, and $R_3$ groups can be joined to form a ring;
- R is a straight, cyclic or branched aliphatic carbon chain group and contains at least 9 aliphatic carbon atoms;
- each R' is an independently selected alkyl or halogen substituent, n is 0 to 3, and R', when present, does not include an R' in the ring position between the pyrazolotriazole nucleus and the sulfonamide; and
- X is hydrogen or halogen.

2. The element of claim 1 wherein the R contains an unsubstituted alkyl group.

3. The element of claim 1 wherein R contains an alkyl group substituted with an ether group.

4. The element of claim 1 wherein X is chloro.

5. The element of claim 1 wherein $R_1$, $R_2$, and $R_3$ are methyl groups.

6. The element of claim 1 wherein the coupler does not have a melting point of 140° C. or higher.

7. The element of claim 1 wherein R is an unbranched alkyl group.

8. The element of claim 1 wherein R is a branched alkyl group.

9. The element of claim 1 wherein R is a substituted alkyl group.

10. The element of claim 1 wherein n is 0.

11. The element of claim 1 wherein n is 1 and R' is not an ether group.

12. The element of claim 1 wherein n is 1 and R' is in the position para or meta to the pyrazolotriazole nucleus.

13. The element of claim 1 wherein n is 1 and R' is in the position ortho to the pyrazolotriazole nucleus but not ortho to the sulfonamide.

14. The element of claim 13 wherein R' is methyl or chloro.

15. The element of claim 1 provided on a reflective support.

16. The element of claim 1 wherein the silver halide is primarily a silver chloride.

* * * * *